May 2, 1950 C. J. FULLER 2,505,955
TANK HANGER

Filed Oct. 29, 1948 2 Sheets-Sheet 1

INVENTOR.
CHESTER J. FULLER
BY Herbert E. Metcalf
ATTORNEY

May 2, 1950  C. J. FULLER  2,505,955
TANK HANGER

Filed Oct. 29, 1948  2 Sheets-Sheet 2

INVENTOR.
CHESTER J. FULLER
BY
Herbert E. Metcalf
ATTORNEY

Patented May 2, 1950

2,505,955

UNITED STATES PATENT OFFICE 2,505,955

TANK HANGER

Chester J. Fuller, Long Beach, Calif., assignor to Northrop Aircraft, Inc., Hawthorne, Calif., a corporation of California Application October 29, 1948, Serial No. 57,358

5 Claims. (Cl. 24—224)

This invention relates to fasteners, and more particularly to an improved hanger for holding bladder type fuel tanks in place in airplane fuel cavities.

Airplane fuel tanks of the self-sealing type are of sufficient thickness and strength to hold their own shape when installed in a fuel cavity and held in the desired position by bolts threaded into molded inserts forming a part of the tank. However, due to the fact that these tanks do not actually seal a caliber .50 bullet hole entirely satisfactorily, and will not seal a hole made by the newer caliber .60 bullet or by a 20 mm. cannon shell, such tanks are being replaced in many instances in favor of a thin nylon cloth or rubberized fabric tank supported in a structural cavity by a plurality of tank hangers on all sides.

These tank hangers should not impose excessive local stresses in the tank walls, either as a result of shop and manufacturing tolerances or by slight shifting of the tank after installation. Since the nylon material does not stretch a substantial amount, such local stresses can easily occur if the hanger has a fixed fastened position. In addition, these conditions make the attachment and detachment operations of the hangers undesirably difficult and time consuming.

It is, therefore, an object of the present invention to provide a tank hanger possessing a degree of relative movement or "slop" when in the fastened position, while at the same time retaining a positive fastening which will not inadvertently come unfastened. This will accomplish the elimination of substantially all stresses between hangers caused by the tolerance allowed in the positions of the tank portion of the hanger and the structural cavity portion of the hanger, and will greatly facilitate attachment and detachment operations.

Since the tank bladder itself must be capable of holding fuel, it is another object of this invention to provide a tank hanger which does not pierce the tank wall.

It is not practical in aircraft to provide access to the entire exterior of the structural cavity in which the tank is to be installed. Accordingly, still another object of the present invention is to provide a tank hanger which may be fastened and unfastened from within the tank without damage to the tank material.

Other objects of this invention will be apparent or will be specifically pointed out in the description of specific apparatus forming a part of this specification, but it is to be understood that the present invention is not limited to the embodiment herein described, as various forms may be adopted within the scope of the appended claims.

In broad terms, the present invention comprises a stud having a shank, a shoulder, and a coned head which engages a keyhole plate having two sized holes and a slot between the holes, this slot just fitting the shank of the stud. The keyhole plate is affixed to one of the parts to be fastened together, and the stud, together with a spring to aid in keeping the hanger parts fastened, is affixed to the other part.

Figure 2:
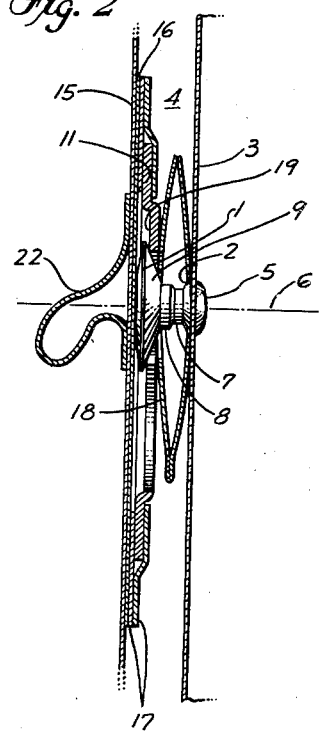
Figure 2 is a vertical section of the same tank hanger, taken as indicated by the line 2—2 in Figure 1, and also showing the tank wall to which it is attached.

Referring first to Figure 2, a stud 1 having a flange 2 near one end is inserted through a structural member 3 forming a wall of a tank cavity 4 with the flange 2 in contact with the tank side of the structural member 3, and on the opposite side the stud end is formed into a rivet head 5 to securely fasten the stud 1 in place. The stud, being symmetrical about its axial center line 6, has a shank 7 immediately next to the flange 2, and a shoulder 8 of greater diameter than the shank 7 adjacent to the shank 7. At the tank end of the stud 1, next to the shoulder 8, a large button head 9 is formed, this button head 9 being cone shaped with the inclined conical surface extending outwardly and away from the structural member 3 from the intersection of the shoulder 8 and the button head 9. The edge at the base of the conical shape is rounded off or beveled as desired.

Figure 1:
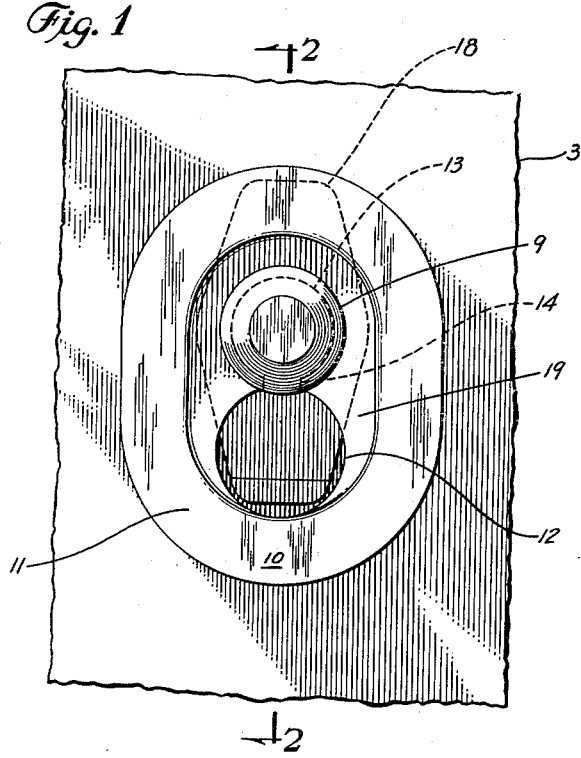
Figure 1 is a face view showing the tank side of an airplane fuel tank hanger of the present invention.

A keyhole plate 10, Figure 1, is made with an encircling mounting rim 11 and two holes side-by-side near the center of the plate 10. The larger plate hole 12 will pass over the button head 9 of the stud 1 while the smaller hole 13 will not. A slot 14 connects the holes 12 and 13 on a line with their centers. This slot 14 is of slightly greater width than the diameter of the shank 7, but of substantially smaller width than the diameter of the shoulder 8, thus enabling the shank 7 to pass through the slot 14, and not enabling the shoulder 8 to do so.

The keyhole plate 10 is attached to the exterior of a tank wall 15 by means of a doubler i. e. intermediate lining 16 and attaching patches 17. No hole or indention whatsoever is made in the tank wall 15.

The tank wall 15 may now be attached to the structural member 3 by placing the button head 9 through the larger plate hole 12, moving the keyhole plate 10 toward the structural member 3 until the slot 14 is lined up with the shank 7, and moving the slot 14 across the shank 7, and pulling the keyhole plate 10 away until the slot 14 is out of alignment with the shank 7. Since the button head 9 will not pass through the smaller plate hole 13, the parts are now fastened together.

Figure 3:
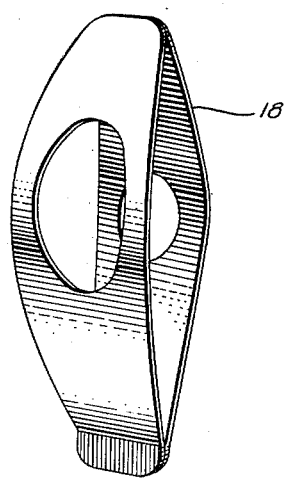
Figure 3 is a perspective view of a spring used on the tank hanger of Figure 2.

A spring 18, Figure 3, is needed to keep the hanger parts from the possibility of coming apart if the slot 14 should accidentally find the shank 7 and the keyhole plate 10 then shift to the larger hole side. The spring 18 in this instance consists of a double convex piece of spring material fitting next to the structural member 3 around the stud flange 2, and bearing against the inclined face of the conical button head 9. The spring 18 cannot slip off because it is closed on all sides, necessitating its installation over the stud 1 before the stud 1 is secured to the structural member 3. However, any other type of spring may be used which performs the desired function of pressing the keyhole plate against the button head, such as a coil spring, for example, or a strip of spring material bent down from the keyhole plate 10.

When the completed hanger is fastened, the spring 18 continually pushes on the edge of the smaller hole 13 in the keyhole plate 10, thus keeping the slot 14 as far as possible from the stud shank 7 at all times. The center portion of the keyhole plate containing the holes is joggled outwardly to form a slightly dishpanned base 19, thereby providing a space between the plane of the holes 12 and 13 and the plane of the mounting rim 11 into which the button head 9 fits without distending the tank material.

It will be noted that when in the fastened position, the keyhole plate 10 may move relative to the stud 1 for a considerable distance, thus permitting a shifting to occur to allow for differences in location of the tank-mounted keyhole plates 10 and the structure-mounted studs 1. With a button head diameter of approximately ¾-inch, the play of the keyhole plate 10 amounts to $\frac{3}{16}$-inch in any direction from the central position. This play occurs from the fact that the keyhole plate can slide over the inclined surface on the back of the button head 9 until it strikes the shoulder 8. The shoulder 8 thus provides the necessary stop to prevent accidental release of the hanger assembly, since the shoulder will not permit the keyhole plate slot 14 to ride over it.

The stud, while shown herein as being riveted in place, may also be made with a threaded end to be secured by a nut, or whatever method is desired. The stud length may also be adapted for installation through a relatively thicker foundation member, such as a honey-combed tank liner, for example, which may be furnished between the tank wall and the irregular shapes of structural beams and the like comprising the airframe.

Figure 4:
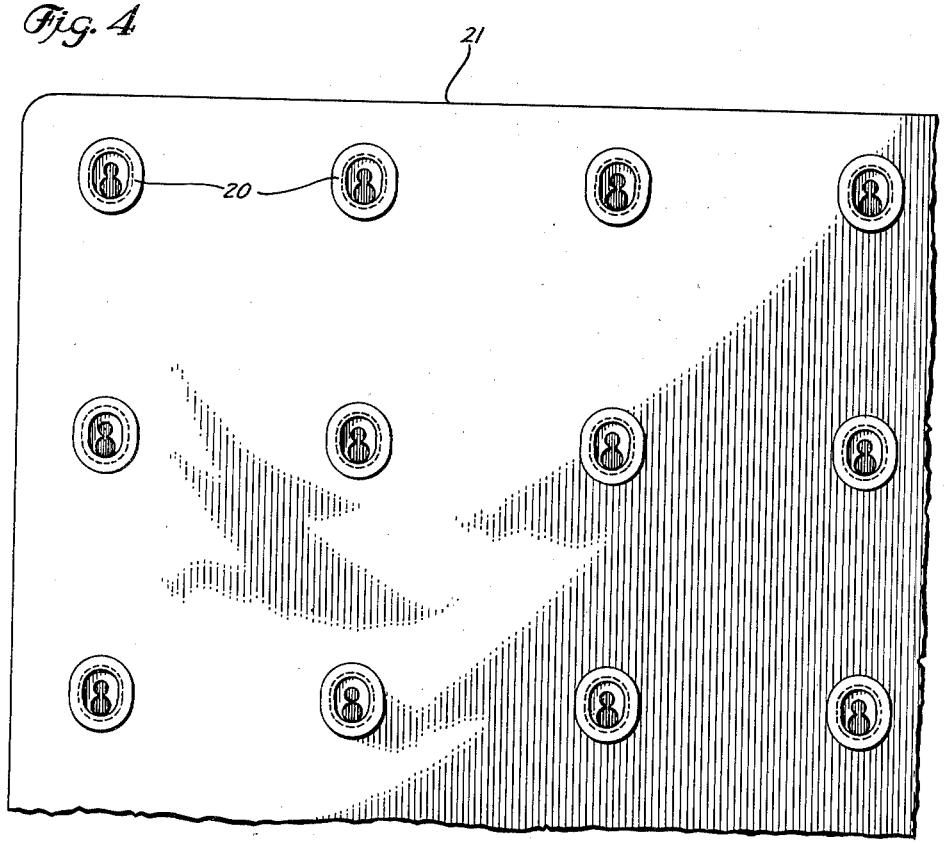
Figure 4 is a diagrammatic view of an exterior wall of a fuel tank, showing an arrangement of the tank portion of the hangers.

Figure 4 shows a method of arrangement of the tank hangers 20 on an outside portion of an entire tank 21. Lines of hangers are preferably spaced about 12 to 15 inches apart in both directions. Tabs or handles 22, Figure 2, may be installed at various locations inside the tank wall 15 to furnish a hand hole for use in engaging the hangers 20. The nylon material of the tank may be left transparent at the keyhole plate holes so that the button head on the outside is visible when engaging the keyhole plate.

The hanger of the present invention is suitable for placement on all walls of the tank, including top and bottom, thus making it unnecessary to provide more than one type of hanger on a single tank. All hangers for any one tank wall are preferably installed with the keyhole plates lined up in the same direction in order to provide uniform fastening operations, and on side walls the smaller hole in the keyhole plate is preferably placed above the larger hole.

While this hanger has been described for use on airplane fuel tanks, it will be obvious that the hanger will work any place where two parts are to be fastened together with a provision for intentional play or slop between them after the hanger is fastened.

What is claimed is:

1. A fastener for parts permitting play therebetween comprising a stud having a shank portion, a shoulder portion larger than said shank positioned adjacent said shank, and a head portion with a frusto-conical surface projecting outwardly from its intersection with said shoulder, said shank, shoulder and head portions being successively disposed on the stud in the order named; a plate having a hole through which said head cannot pass, and also having a slot dimensioned to prevent passage of said shoulder therethrough but to permit passage of said shank therethrough to obtain an engaged position where said surface is in contact with the edge of said hole; and elastic means tending to hold the parts in said engaged position, there being a substantial difference between the diameter of said shoulder and the diameter of said hole whereby said plate can move relative to said stud while still remaining in said engaged position.

2. A fastener for parts permitting play therebetween comprising a stud having a shank portion, a shoulder portion larger than said shank positioned adjacent to said shank, and a head portion with a frusto-conical surface projecting outwardly from its intersection with said shoulder, said shank, shoulder and head portions being successively disposed on the stud in the order named; a plate having a large hole through which said head can pass, a smaller hole through which said head cannot pass, and a slot connecting said holes, said slot being too narrow to permit passage of said shoulder therethrough but wide enough to permit passage of said shank therethrough; and elastic means adapted to force said plate against said surface away from said shank when said head is engaged in said smaller hole, there being a substantial difference in size between the diameter of said shoulder and the diameter of said smaller hole whereby said plate can move relatively to said stud while remaining in said engaged position.

3. Apparatus in accordance with claim 2 including means to fasten said stud to a supporting member, said surface providing a non-rigid contact with the edge of said smaller hole whereby said plate can move relative to said stud, in a plane substantially perpendicular to the axis of said stud, until the edge of said smaller hole strikes said shoulder.

4. Apparatus in accordance with claim 2 including means to fasten said stud to a supporting member, and wherein said elastic means is a spring surrounding said stud to push the edge of said smaller hole against said surface in a direction away from said shank when said head is engaged with said smaller hole, but not preventing a substantial sideways motion of said plate relative to said stud, this motion being stopped by contact of the edge of said smaller hole with said shoulder.

5. In an airplane having a removable fuel-containing cell attached in a structural cavity; a hanger comprising a cell-mounted plate having a hole with a relatively narrow hole-entrance slot; a cavity-mounted stud having a head portion too large to pass through said hole, a shoulder portion smaller than said hole but too large to pass through said slot, and a shank portion small enough to pass through said slot, said head having a frusto-conical surface extending outwardly from its intersection with said shoulder, said shank, shoulder and head portions being successively disposed on the stud in the order named, said stud being adapted to engage with said plate in a position where the edge of said hole bears on said surface; and elastic means tending to hold said stud and said plate in said engaged position, whereby said cell-mounted plate can move a substantial amount relative to said cavity-mounted stud before being stopped by the edge of said hole striking said shoulder.

CHESTER J. FULLER.

REFERENCES CITED

The following references are of record in the file of this patent:

UNITED STATES PATENTS

| Number | Name | Date |
|--------|------|------|
| 714,885 | Faught | Dec. 2, 1902 |
| 988,558 | England | Apr. 4, 1911 |